UNITED STATES PATENT OFFICE.

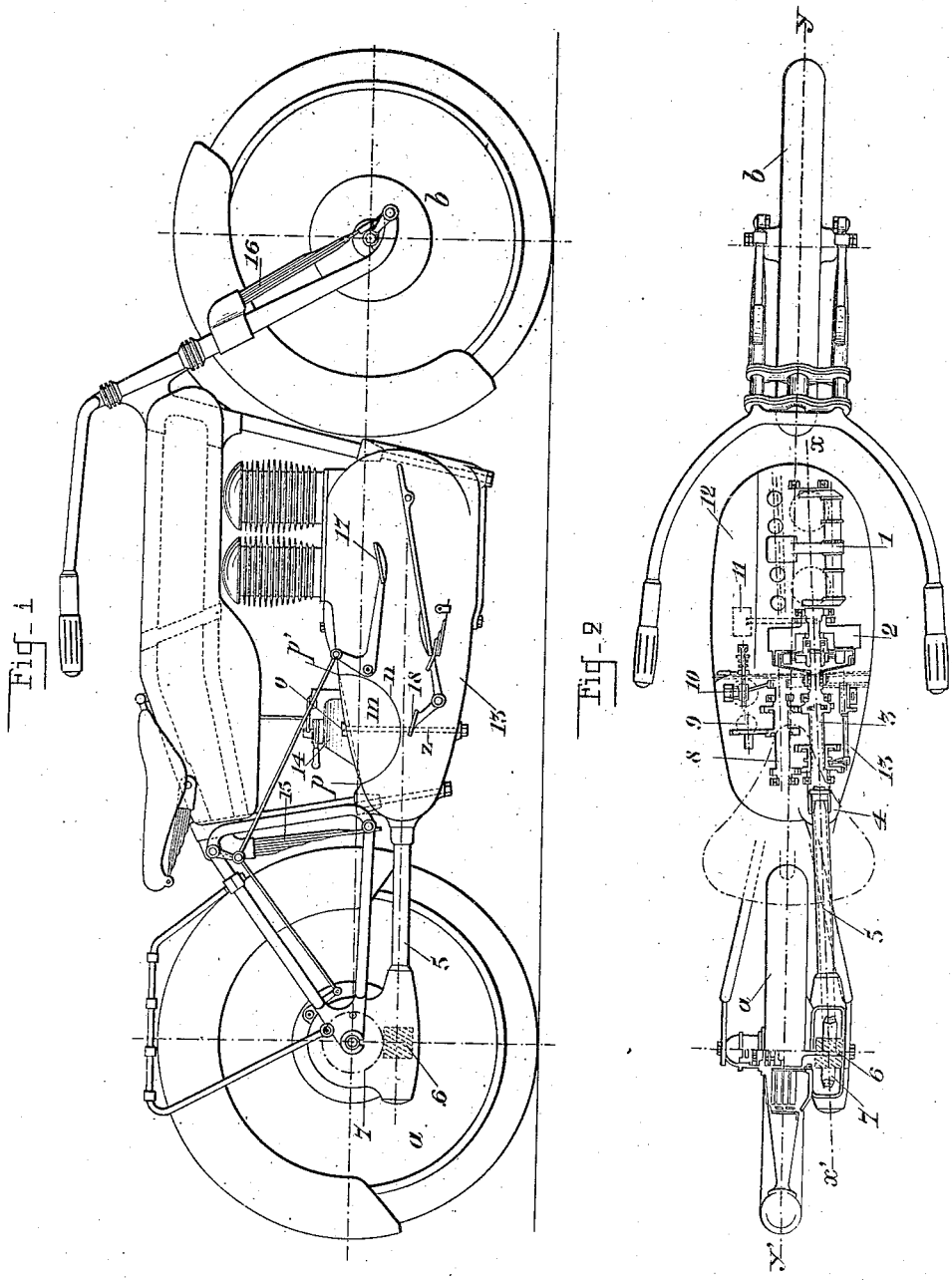

FELIX AMIOT, OF COLOMBES, FRANCE.

ARRANGEMENT OR GROUPING OF THE PARTS OF THE TRANSMISSION-GEAR IN MOTORCYCLES AND GEAR-CASE THEREFOR.

1,378,309.             Specification of Letters Patent.    Patented May 17, 1921.

Application filed February 14, 1920. Serial No. 358,611.

*To all whom it may concern:*

Be it known that I, FELIX AMIOT, citizen of the Republic of France, and residing at Colombes, Seine, France, have invented Improvements in or Relating to the Arrangement or Grouping of the Parts of the Transmission-Gear in Motorcycles and in Gear-Cases Therefor, of which the following is a specification.

The characteristic feature of this improved grouping consists in arranging in the same line, suitably set off relatively to the symmetry axis passing through the diametral plane of the wheels, the transmission shaft in line with which are arranged the engine crank shaft, the clutch, the first shaft of the change speed box or the operating shaft of any suitable control for the change speed box, the ball-and-socket joint, and the Cardan shaft fixed to the parts for driving the toothed wheel fixed to the driving wheel. The improved grouping allows of balancing completely the masses relatively to the symmetry axis, while taking the driving couple into consideration, and of arranging the parts in a single gear-case having an externally regular shape relatively to the symmetry axis.

In the accompanying drawings which illustrate by way of example a suitable practical form of this invention:—

Figure 1 is a side elevation of a motor cycle embodying the present improvements, and Fig. 2 is a plan partly in section, the upper part of the gear-case being assumed to be removed to show the parts mounted in the latter.

The same numerals and letters of reference indicate the same parts in both the figures.

As shown, $y, y'$ is the symmetry axis passing through the diametral plane of the wheels $a, b$. $x, x'$ is the axis of the transmission gear which incloses with the symmetry axis $y, y'$, a suitable angle to allow of transmitting the motion to the rear driving wheel $a$. In line with this axis $x, x'$ there are arranged the crank shaft of the engine 1, the fly-wheel, the clutch 2, the primary shaft of the change speed box 3 or the operating shaft of any suitable change speed gear, the ball-and-socket joint 4 and the Cardan shaft 5 that is fixed to the bevel pinion or to a worm such as 6, driving the worm wheel 7 fixed to the driving wheel.

As will be seen, the entire mechanical combination specified above is thus suitably arranged to balance completely the masses relatively to the symmetry axis, taking of course the driving couple into consideration. On the other hand, Fig. 2 shows the position of the counter shaft 8, as well as the more usual accessories of the machine, such as for instance an inflater 9, a starting device 10, a lighting dynamo 11, and an exhaust pot or silencer 12.

The above mentioned mechanical parts are arranged in a gear-case 13 composed of two portions of which one portion $m$ which constitutes the cover proper of the gear-case, terminates in a joint of circular form $n$, forming in the body of the gear-case a cylindrical portion whose axis may be at right angles to the symmetry axis, to the driving shaft or to any other judiciously selected intermediate shaft. The center through which the axis of this cylinder passes is so located as to allow of obtaining an orifice sufficient for the introduction and mounting of the parts contained in the gear-case. Similarly, the radius is such that the circumference passes preferably through the center of the inner ball bearings for the purpose of facilitating their mounting. The center $c$ may likewise be so arranged as to be situated slightly above the chord $p\ p'$ connecting together the two points of contact of maximum height so as to allow a tight joint to be made by the clamping action of bolts, such as $z$.

This gear-case has the characteristic feature of being of regular shape (apart from the constructional bearing surfaces of bosses) relatively to the symmetry axis $y\ y'$. This gear-case 13 thus contains all the mechanical parts, and in addition in the case of motor cycles with change speed gear, it comprises the control for operating the clutch, the control for operating the change speed box, the control for operating the starting device, etc. It may also be arranged in such a manner as to receive at 12 the silencer without altering its outward appearance.

The cover of the gear-case may also comprise the seating surfaces for the magneto, the inflator, the starting device and all other mechanical devices.

Having now particularly described and ascertained the nature of my said invention and in what manner the same is to be performed, I declare that what I claim is:

A motor cycle, in which the parts serving for the mechanical transmission of the driving power are arranged in a line suitably offset relatively to the axis of symmetry passing through the diametral plane of the wheels, and a single gear case of externally regular shape relatively to the symmetry axis wherein said transmission parts are disposed, said gear-case being provided with a cover having the form of a spherical cap with a circular joint so as to allow a tight closure of the said cover to be effected by the clamping action of the fastening bolts.

In testimony whereof I have signed my name to this specification in the presence of two subscribing witnesses.

FELIX AMIOT.

Witnesses:
ANDRÉ BORDILLON,
JULES FAYOLLET.